United States Patent [19]

Blair

[11] Patent Number: 4,553,791
[45] Date of Patent: Nov. 19, 1985

[54] LINKED CHAIN

[75] Inventor: Ian L. Blair, Dunston, England

[73] Assignee: George Blair Public Limited Company, Newcastle upon Tyne, England

[21] Appl. No.: 541,103

[22] Filed: Oct. 12, 1983

[30] Foreign Application Priority Data

Oct. 15, 1982 [GB] United Kingdom ............... 8229549

[51] Int. Cl.[4] ............................................. B62D 55/20
[52] U.S. Cl. ........................................ 305/39; 305/54; 474/226
[58] Field of Search ................. 474/206, 226; 305/39, 305/54

[56] References Cited

U.S. PATENT DOCUMENTS

| 697,165 | 4/1902 | Palmros | 474/206 X |
| 800,575 | 9/1905 | Hickey | 474/226 |
| 1,691,680 | 11/1928 | Thompson | 474/226 |

Primary Examiner—David A. Scherbel
Attorney, Agent, or Firm—Abelman, Frayne, Rezac & Schwab

[57] ABSTRACT

A length of chain, particularly in the form of an endless track for a tracked vehicle, consists of a plurality of interconnected chain links each of which includes a pair of opposed link parts. Each link part comprises a side portion together with pin portions and/or bush portions which project inwardly of the associated side portions. The pin portions of one link are rotatably received within the bores of corresponding bush portions of the adjacent link.

9 Claims, 4 Drawing Figures

LINKED CHAIN

BACKGROUND OF THE INVENTION

This invention relates to a length of chain and has particular but not exclusive application to endless tracks for tracked vehicles that comprise a series of interconnected chain links to each of which links is attached an associated-ground engaging pad or shoe.

The individual chain links of endless tracks of this type each commonly consist of four interconnected components, namely two opposed side link portions, a bush extending between two opposed ends of said link portions and a pivot pin extending between the other two ends of said link portions. The side portions of such links are forgings which must be very carefully machined and heat treated to provide therein accurately dimensioned apertures and/or recesses in which the ends of the bushes and the ends of the pins are close push fits, said bushes and pins being made from bars and tubes which are ground to size and heat treated.

Thus it will be appreciated that the formation of each link requires a substantial amount of machining of the basic forgings, while extra material must be left on said basic forgings to allow for the subsequent shaping that is to take place. As a consequence, the material of the links, typically of good quality steel, must be readily machinable to enable said accurate machining to be performed, whereby the links, including the pins and bushes, are prone to wear in use.

It would be desirable to be able to provide a length of chain and in particular an endless track consisting of interconnected chain links each of which links was of simpler construction and less prone to wear than the links of existing tracks.

SUMMARY OF THE INVENTION

According to the present invention there is provided a length of chain including a plurality of interconnected chain links, said links each comprising a pair of opposed link parts, each link part including a side portion and, projecting inwardly of said side portion adjacent the end regions thereof, pin portions and/or bush portions, the opposed bush portions of a link abutting one another and the bore of a bush portion being continued through the associated side portion, the arrangement being such that opposed portions of one link are received within, to be rotatable in, opposed bush portions of the adjacent link.

In one embodiment of the invention, each link part includes a side portion formed with a bush portion adjacent one end thereof and a pin portion adjacent the other end thereof.

In an alternative embodiment of the invention the length of chain includes a plurality of pairs of interconnected chain links, one link of each pair comprising a pair of opposed link parts, each link part including a side portion and a pair of pin portions one adjacent each end of said side portion, and the other link of each pair comprising a pair of opposed link parts, each link part including a side portion and a pair of bush portions one adjacent each end of said side portions, the arrangement being such that the opposed pin portions adjacent one end of the side portions of the one link of a pair of chain links are received within, to be rotatable in, the opposed bush portions adjacent one end of the side portions of the other link of said pair of chain links, and the opposed pin portions adjacent the other end of the side portions of said one link of a pair of chain links are received within, to be rotatable in, the opposed bush portions adjacent the other end of the side portions of the other link of an adjacent pair of chain links.

The pin portions and/or bush portions of the link parts may be formed from the same piece of material as the associated side portions or, alternatively, may be welded, rivetted or otherwise secured to said side portions.

In all embodiments, it is preferred that the free end of the bush portion of a link part is shaped to receive and locate therein the correspondingly-shaped free end of the bush portion of the opposed link part.

Conveniently the pin portions of a link part are each less than half the width of a link and may taper slightly from the associated side portion towards the free end of the pin portion.

In a preferred embodiment of the invention, an increased-diameter shoulder is formed on each pin portion at its junction with the inner face of the associated side portion, and, for each associated bush portion, a correspondingly-shaped, increased-diameter recess is formed in the outer face of the associated side portion at the end of the continuation through the side portion of the bore of said associated bush portion. In use, and with the pin portions of one link received within the bush portions of an adjacent link, the shoulders on said pin portions of the one link are received within the associated recesses in the side portions of said adjacent link.

The two side portions of a link are conveniently formed with means permitting attachment thereto of an associated pad or shoe, said means preferably comprising a pair of bores extending through to the lower surface of each side portion whereby a pad or shoe can be bolted to said lower surface of the link. Said pad or shoe may effectively secure the two opposed link parts together.

The invention also provides chain links as defined above for use in the formation of a length of chain conveniently in the form of an endless track for a tracked vehicle but which also has application as a rack for a rack and pinion arrangement.

It will be appreciated that the integration of the pin portions and bush portions with the associated side portions of a link reduces significantly the amount of accurate machining required in the preparation of the links, thus enabling, if desired, a much harder and therefore more wear-resistant material to be used than before. Further, each link only comprises two basic components thus simplifying considerably the formation of an endless track from such links.

DESCRIPTIONS OF THE PREFERRED EMBODIMENTS

Figure 1:
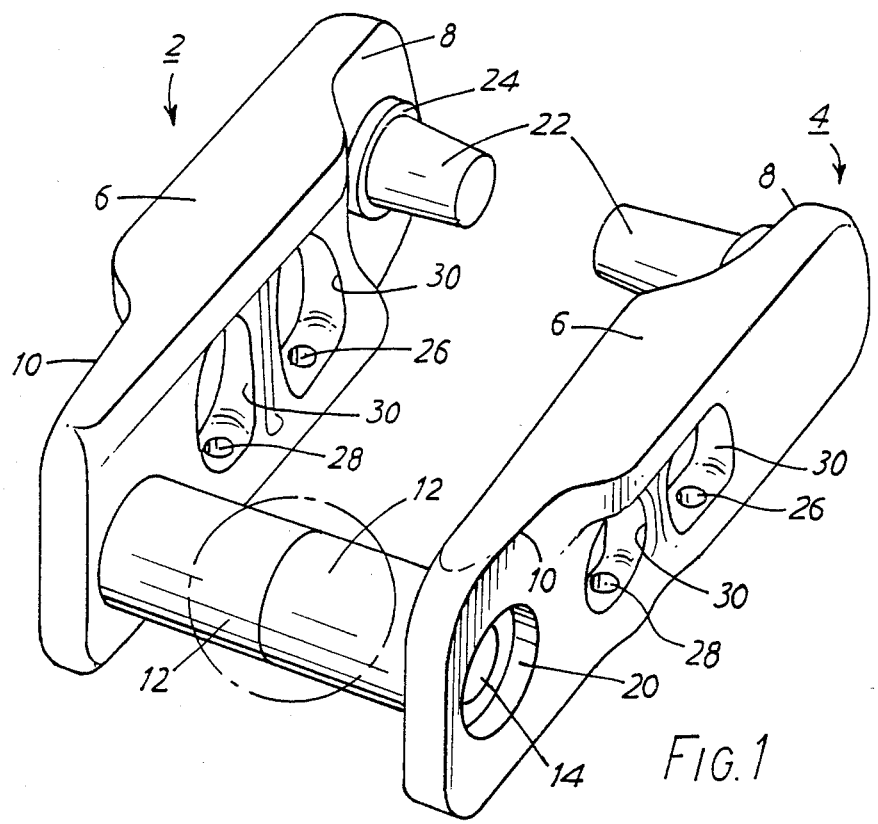
FIG. 1 shows a link of a first endless track according to the invention.
Figure 2:
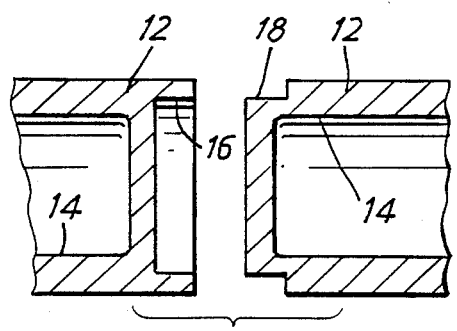
FIG. 2 is a detail in section of the junction of the bush portions of the link of FIG. 1.

Referring to FIGS. 1 and 2 of the drawings, the illustrated link comprises two basic components or link parts referenced 2 and 4 respectively. The two parts 2 and 4 are substantially mirror images of one another, apart from minor detail to be described below, and like features of the two link parts will be similarly referenced.

Each link part includes a plate-like side portion 6 internally recessed at 8 at one end and externally recessed at 10 at the other end whereby the one ends of said portions 6 are laterally offset outwardly of the other ends of said portions 6.

Integrally formed with each side portion 6 is a substantially cylindrical bush portion 12 extending perpendicularly and inwardly of the other end of the associated side portion 6. The free ends of the bush portions 12 remote from the side portions 6 are closed while the bores 14 of said bush portions 12 are continued through the associated side portions 6. The wall defining the free end of the bush portion 12 of the link part 2 is internally recessed at 16, while the wall defining the free end of the bush portion 12 of the link part 4 is externally recessed at 18 such that said free ends of the bush portions 12 are received one within the other to locate the two link parts 2,4 relative to one another in coaxial alignment.

An increased diameter recess 20 is formed in the outer face of each side portion 6 around the end of the bore 14 for reasons which will become apparent.

Also integrally formed with each side portion 6 is a pin portion 22 extending perpendicularly and inwardly of the one end of the associated side portion 6, each pin portion 22 being less than half the width of the link and of substantially the same diameter as that of the bore 14 through a bush portion.

An increased-diameter shoulder 24 is formed around each pin portion 22 at its junction with the side portion 6, the arrangment being such that, on assembly of a chain from the link parts, the pin portion 22 of one link part is received within the bore of the bush portion 12 of the adjacent link part, the shoulder 24 on said pin portion 22 being received within the recess 20 in the outer face of said adjacent link part. In practice, a pair of seals, in the form of two back-to-back tapered washers, react between each recess 20 and its associated shoulder 24. The pin portions 22 are a close fit in the bores 14 but are freely rotatable therein.

Each side portion 6 has a pair of bores 26,28 formed therein as shown in FIG. 1 through each of which can be passed a bolt to enable attachment to the link of an associated pad or shoe (not shown). The square nuts securing the bolts are held captive in apertures 30 formed in the side portions 6 whereby said nuts are prevented from turning when the bolts are tightened.

In assembling a chain, the link parts 2 are initially interconnected one with the other with the pin portions 22 thereof received within the associated bush portions 12, while the link parts 4 are similarly interconnected. The two series of interconnected link parts 2 and 4 are then adjoined by locating the shaped free ends of opposed bush portions 12 one within the other to complete the links, and the pads or shoes are secured to each link as detailed above thereby retaining the link parts 2,4 together and completing the endless chain track.

The formation of the link parts 2,4 with the pin portions 22 and bush portions 12 integrally formed with the side portions 6 clearly obviates the necessity for accurate machining of said side portions to receive the pin portions and bush portions which, in turn, enables said link parts to be made out of hard, wear-resistant materials, such as cast alloys that are difficult to forge and machine. The same advantages prevail if the pin portions 22 and bush portions 12 are initially formed separately from, but are then welded, rivetted or otherwise secured to, the side portions 6 as within the scope of the invention. Further, the simplicity in construction of the two-part link facilitates assembly of the chain.

The described links do not require any change in established track undercarriage equipment such as sprockets, rollers, shoes and idlers, of the associated vehicles.

Compared with established links, the lower surfaces of the side portions 6 of the described links are wider to provide an extended track shoe location area, resulting in a more rigid construction once the shoes are bolted to the links.

Figure 3:
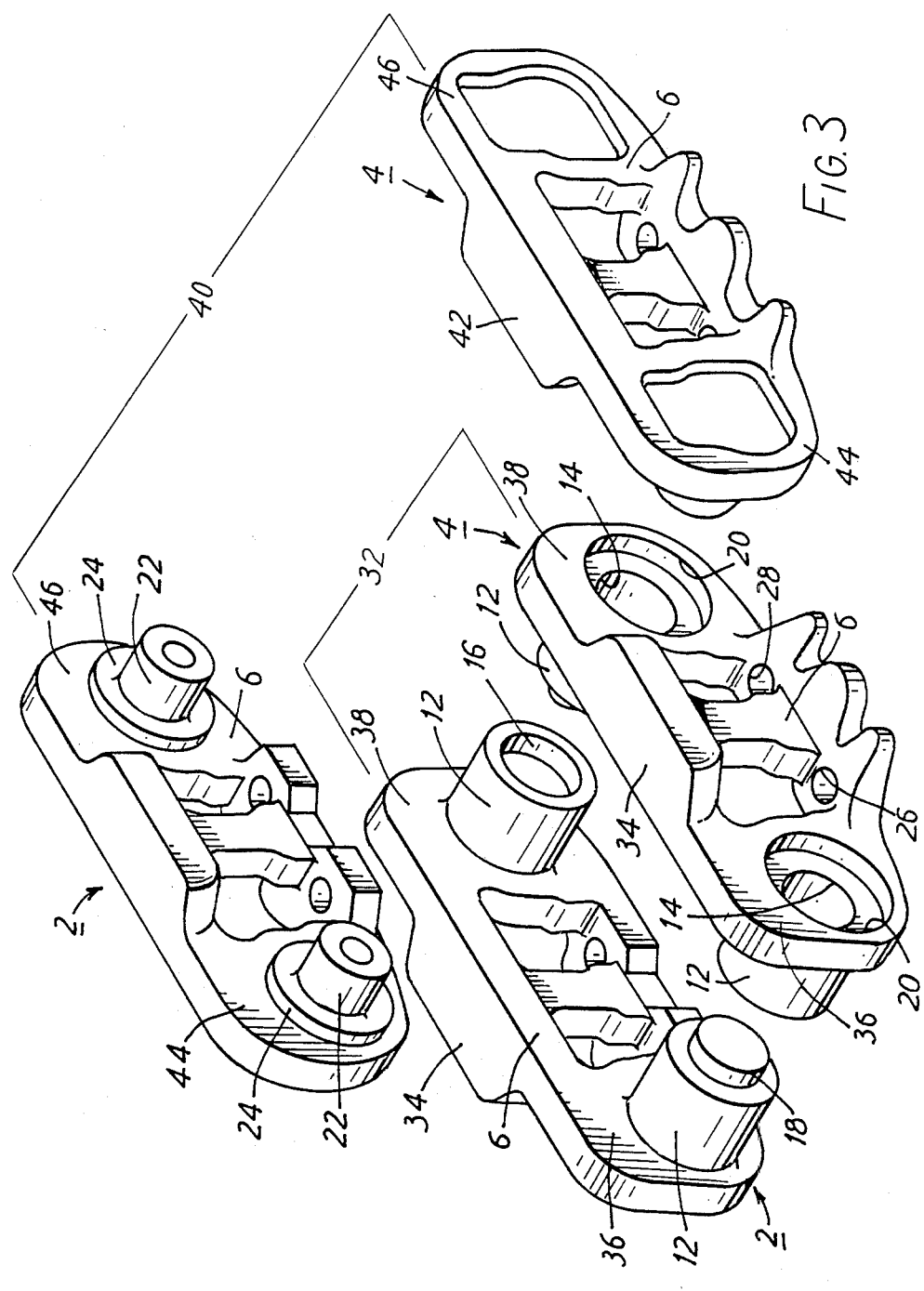
FIG. 3 is an exploded view of a pair of chain links of a further endless track according to the invention.
Figure 4:
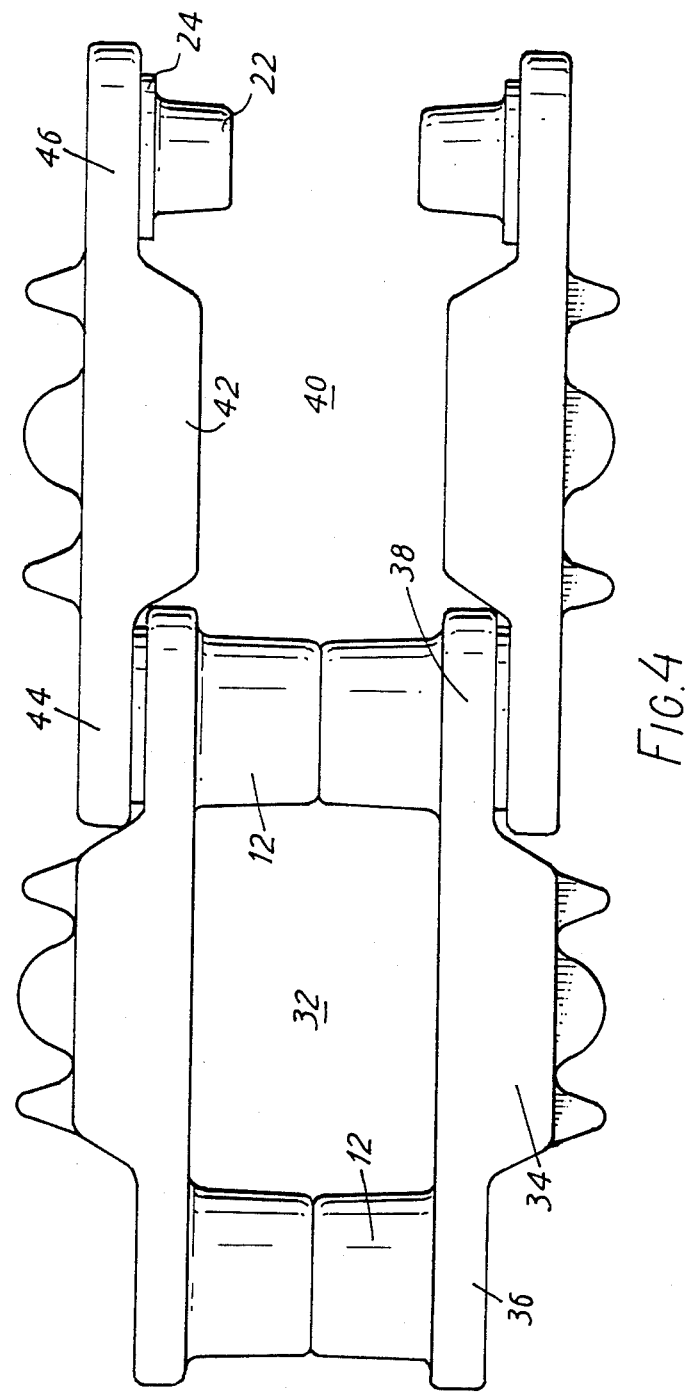
FIG. 4 is a plan view of the assembled links of FIG. 3.

Referring to the FIGS. 3 and 4, there is shown an alternative link arrangement for use in forming an endless track for a tracked vehicle in accordance with the invention, and components of the links shown in FIGS. 3 and 4 equivalent or similar to those of FIGS. 1 and 2 are similarly referenced.

More particularly, the alternative endless track comprises a series of pairs of chain links, one pair of links being shown in FIGS. 3 and 4. The first link of the pair is indicated generally at 32 and can be termed a bush link. Said link comprises opposed link parts 2,4 each including a plate-like side portion 6 the upper surface of which has formed thereon an outwardly extending projection 34 intermediate the length of the link, said projection separating ends 36,38 to the side portions 6.

Integrally formed with each side portion 6 of the link 32 are two substantially cylindrical bush portions 12, one at each end 36,38 of said side portions 6. Opposed bush portions 12 of the two side portions 6 are shaped at 16,18 to be received one within the other, while the bores 14 of the bush portions 12 are continued through the associated side portions 6. Increased diameter recesses 20 are formed in the outer face of each side portion 6 around the ends of the bores 14.

The second link of a pair of links is indicated generally at 40 and can be termed a pin link. Said link comprises a pair of opposed link parts 2,4 each including a plate-like side portion 6 the upper surfaces of which each have formed thereon an inwardly-extending projection 42 intermediate the length of the link, said projections 42 separating ends 44,46 to the side portions 6.

Integrally formed with each side portion 6 of the link 40 are a pair of pin portions 22 one at each end 44,46 of the side portions 6. An increased-diameter shoulder 24 is formed around each pin portion 22 at its junction with a side portion 6.

On assembly of the links 32,40 of a pair as shown in FIG. 4, the pin portions 22 at the ends 44 of the side portions 6 of the link 40 are received within the bores 14 of the bush portions 12 at the ends 38 of the link 32 with the shoulders 24 on said pin portions 22 being received within the corresponding recesses 20 in the outer face of the link parts 2,4 of the link 32. Further, on said assembly, the overlapping ends of the adjacent side portions 6 of the links 32,40 and the projections 34,42 on the links 32,40 respectively are substantially longitudinally aligned, as best seen in FIG. 4.

It will be appreciated that an endless track can readily be assembled from a plurality of pairs of links as detailed above with reference to FIGS. 3 and 4. The attachment of shoes is substantially as described with reference to the embodiment of FIGS. 1 and 2, while the advantages to be gained from this alternative embodiment over known arrangements are again as detailed above with reference to the link illustrated in FIGS. 1 and 2. An additional advantage of a track made up of pairs of links as shown in FIGS. 3 and 4 is that it can be readily disassembled at any point merely by disconnecting the shoes from any link 40 and withdrawing the two link parts 2,4 of said link from one another. Thus any worn or faulty link can easily be removed from the length.

In the embodiment of FIGS. 1 and 2 a master link can be included in the chain of such a construction so as to permit ready removal of said master link and subsequent disassembly of the track. Alternatively and preferably, however, an endless track made up of links as shown in FIGS. 1 and 2 includes at least one pair of links 32,40 to permit breakage of the chain by disassembly of the link 40.

It will be appreciated that an endless track may comprise a plurality of links as shown in FIGS. 1 and 2 together with a plurality of pairs of links as shown in FIGS. 3 and 4.

In a slightly modified version of the alternative endless track described with reference to FIGS. 3 and 4, the bush links 32 are each provided with symmetrical upper and lower projections 34 through each of which are formed bores such as 26,28, while the pin links 40 are each provided with symmetrical upper and low projections 42 again through each of which are formed bores such as 26,28. Thus it will be appreciated that such links, being of symmetrical configurations, can be installed in a length of chain either way up enabling their positions to be reversed once wear of the engaging components has reached an undesirable level. Further, the configurations of the links are such that the track comprised of said links can be driven in either direction. Thus, once a track has worn to an undesirable extent, its mounting on the associated vehicle can be reversed.

It will be appreciated that the above-detailed features enable the life of a length of chain to be considerably extended because of the various different orientations possible for the individual chain links which, in turn, distribute the wear on said links.

Although described in relation to the formation of an endless track, links as described could be combined to form a length of chain to be used as a rack in a rack and pinion arrangement. Other applications for lengths of chain according to the invention will be apparent to those skilled in the art.

What I claim and desire to secure by Letters Patent is:

1. A length of chain including a plurality of interconnected chain links in which the links each comprise a pair of opposed link parts, the link parts including side portions and, projecting substantially perpendicularly inwardly of said side portions adjacent the end regions thereof, pin portions and bush portions, the opposed bush portions of a link abutting one another and the bore of a bush portion being continued through the associated side portion, the arrangement being such that opposed pin portions of one link are received within, to be rotatable in, opposed bush portions of the adjacent link.

2. A length of chain as claimed in claim 1 in which each link part includes a side portion formed with a bush portion adjacent one end thereof and a pin portion adjacent the other end thereof.

3. A length of chain as claimed in claim 1 in which the free end of a bush portion of a link part is shaped to receive and locate therein the correspondingly-shaped free end of the opposed bush portion of the other link part.

4. A length of chain as claimed in claim 1 in which the pin portions of a link part are less than half the width of a link and taper from the associated side portion towards the free end of the pin portion.

5. A length of chain as claimed in claim 1 in which an increased-diameter shoulder is formed on each pin portion at its junction with the inner face of the associated side portion, and, for each associated bush portion, a correspondingly-shaped, increased-diameter recess is formed in the outer face of the associated side portion at the end of the continuation of the bore of said associated bush portion.

6. A length of chain as claimed in claim 1 in the form of an endless track for a tracked vehicle, the two side portions of each link being provided with means permitting attachment thereto of an associated shoe.

7. A length of chain as claimed in claim 6 in which each side portion has formed therein a pair of bores extending through to the lower surface of said side portion to define said means whereby a shoe can be bolted to the lower surface of the link.

8. A length of chain including a plurality of pairs of interconnected chain links, one link of each pair comprising a pair of opposed link parts, each said link part including a side portion and a pair of pin portions one adjacent each end of said side portion, and the other link of each pair comprising a pair of link parts, each said link part including a side portion and a pair of bush portions one adjacent each end of said side portion, the arrangement being such that the opposed pin portions adjacent one end of the side portions of the one link of a pair of chain links are received within, to be rotatable in, the opposed bush portions adjacent one end of the side portions of the other link of said pair of chain links, and the opposed pin portions adjacent the other end of the side portions of said one link of a pair of chain links are received within, to be rotatable in, opposed bush portions adjacent the other end of the side portions of the other link of an adjacent pair of chain links.

9. Chain links for use in the formation of lengths of chain, each said chain link including a pair of opposed link parts, the link parts including side portions and, projecting substantially perpendicularly inwardly of said side portions adjacent the end regions thereof, pin portions and bush portions, the opposed bush portions of a link butting one another and the bore of a bush portion being continued through the associated side portion, the arrangement being such that opposed pin portions of one link are received within, to be rotatable in, opposed bush portions of the adjacent link.

* * * * *